Patented May 3, 1949

2,468,779

UNITED STATES PATENT OFFICE 2,468,779

PRINTING INKS

Charles A. Rietz, Park Ridge, and Raymond F. Lecture, Chicago, Ill., assignors to Interchemical Corporation, New York, N. Y., a corporation of Ohio No Drawing. Application April 28, 1945, Serial No. 590,952

2 Claims. (Cl. 260—33.2)

This invention relates to printing inks which can be set or dried by the application of water thereto, and aims to provide an ink of this type characterized by improved press-stability and printing properties and toughness of film, as compared with previously known inks of the same type.

Inks which may be dried by the application of water upon the freshly printed film and methods of printing with such inks are disclosed and claimed in Gessler et al. Patent No. 2,157,385, dated May 9, 1939. Such inks contain a water-soluble solvent, usually a polyglycol or a polyether alcohol. When water is sprayed upon or otherwise added to a printed film of an ink of this character, it causes the ink binder to be precipitated so that upon evaporation or removal of the solvent and water, such as by penetration into the paper, the ink is substantially dry. Due to the fact that the solvents best suited for use in these inks are hygroscopic, difficulties in operation are encountered when the weather is humid.

Various methods have been suggested to overcome this problem, among others the use of rosin modified by the diene addition of maleic or fumaric acid (U. S. Patent No. 2,244,103, dated June 3, 1941). While these improved inks are less susceptible to precipitation difficulties in humid weather, they leave much to be desired in printability. In particular, the flow of the inks and the wetting properties of such vehicles are apt to be poor, resulting in poor impressions from halftones.

We have discovered that improved inks of this type can be obtained by using as the vehicle of the ink a solvent of the group consisting of water-soluble polyglycols and water-soluble polyglycol mono-ethers, having dissolved therein a resin consisting of the unmodified polymerized glycerol ester of endo methylene tetrahydro-phthalic acid. The resin is unique in its ability to improve the stability of other resins against precipitation by humid atmosphere, and this invention contemplates the blending of this resin with other glycol-soluble resins.

Typical examples of our inks are the following:

Example 1—Red ink

| | Parts by weight |
|---|---|
| Bakelite resin BR-13260 (unmodified glycerol ester of endo methylene tetrahydro-phthalic acid) | 60 |
| Diethylene glycol | 40 | are melted together at 120° C. to make a varnish. An ink is made by grinding—

| | Parts by weight |
|---|---|
| Barium lithol red | 20 |
| Diethylene glycol | 10 |
| Varnish | 70 |

This ink has unusually good stability at very high humidities.

Example 2—Blue ink

| | Parts by weight |
|---|---|
| Peacock blue | 60 |
| Diethylene glycol | 10 |
| Varnish of Example 1 | 60 | produces an ink as good as that of Example 1.

Example 3—Yellow ink

With yellow pigment, the formula needed to produce an ink comparable with that of Examples 1 and 2 is—

| | Parts by weight |
|---|---|
| Medium chrome yellow | 90 |
| Diethylene glycol | 10 |
| Varnish of Example 1 | 40 |

A principal use of our invention is in the stabilization of inks made from other resins. Thus, we prepared a resin by reacting 100 parts of rosin with 40 parts of fumaric acid. A varnish prepared from 58% of this resin and 42% diethylene glycol had a body essentially similar to that of Example 1. When substituted in Example 1 for the varnish made from the glycerol endo methylene tetrahydro-phthalic acid resin, an ink was obtained which failed on the press in 20 minutes at 67% relative humidity, at 78° F. A blend of 20% of the varnish of Example 1 with 80% of the rosin-fumaric varnish, made into the ink of Example 1, gave a 50% increase in press-stability.

This improvement by blending is noticeable with other resins, including those described in U. S. Patent No. 2,244,103, the terpene-phenolic resins, "Vinsol," and other resins which are soluble in the polyglycols, but which, in the absence of the glycerol-endo methylene tetrahydrophthalic resin, are sensitive to high humidities.

Examples can of course be multiplied indefinitely without departing from the scope of the invention as defined in the claims. In particular, other water-soluble polyglycols (e. g. dipropylene glycol, tetraethylene glycol, etc.) and their water-soluble derivatives (e. g. the mono-ethers) can be used to replace the diethylene glycol.

We claim:

1. A typographic printing ink characterized by its ability to be set by the application of water to the film and by its stability at high humidities, which comprises pigment dispersed in a vehicle containing as binder a resinous glycerol ester of endo methylene tetrahydro-phthalic acid dissolved in a liquid water-soluble solvent of the group consisting of polyglycols and their monoethers.

2. A typographic printing ink characterized by its ability to be set by the application of water to the film and by its stability at high humidities, which comprises pigment dispersed in a vehicle the binder of which consists of a polyglycol soluble resin which is precipitated from solution in the polyglycol on exposure to air at high humidities, in combination with a resinous glycerol ester of endo methylene tetrahydro-phthalic acid dissolved in a liquid water-soluble solvent of the group consisting of polyglycols and their monoethers.

CHARLES A. RIETZ.
RAYMOND F. LECTURE.

REFERENCES CITED

The following references are of record in the file of this patent:

UNITED STATES PATENTS

| Number | Name | Date |
|---|---|---|
| 2,375,960 | Stoops et al. | May 15, 1945 |